(12) United States Patent
Tsubota

(10) Patent No.: US 8,942,262 B2
(45) Date of Patent: Jan. 27, 2015

(54) COMMUNICATION DEVICE, COMMUNICATION SYSTEM AND COMPUTER READABLE MEDIUM

(75) Inventor: Hirokazu Tsubota, Tokyo (JP)

(73) Assignee: Fuji Xerox Co., Ltd., Tokyo (JP)

( * ) Notice: Subject to any disclaimer, the term of this patent is extended or adjusted under 35 U.S.C. 154(b) by 512 days.

(21) Appl. No.: 13/116,630

(22) Filed: May 26, 2011

(65) Prior Publication Data

US 2012/0092694 A1 Apr. 19, 2012

(30) Foreign Application Priority Data

Oct. 13, 2010 (JP) ................................. 2010-230477

(51) Int. Cl.
| | |
|---|---|
| *H04J 3/04* | (2006.01) |
| *G06K 15/00* | (2006.01) |
| *G06F 3/12* | (2006.01) |
| *G06F 13/00* | (2006.01) |
| *G06K 15/02* | (2006.01) |
| *H04L 1/00* | (2006.01) |

(Continued)

(52) U.S. Cl.
CPC .............. *G06K 15/4045* (2013.01); *G06F 3/12* (2013.01); *G06F 13/00* (2013.01); *G06K 15/1821* (2013.01); *G06F 3/1211* (2013.01); *G06F 3/1236* (2013.01); *G06F 3/1284* (2013.01); *H04L 1/00* (2013.01); *H04L 1/0083* (2013.01); *H04L 1/1867* (2013.01); *H04L 12/50* (2013.01); *H04N 1/32619* (2013.01); *H04N 1/32641* (2013.01); *H04N 1/32797* (2013.01); *G06F 3/1241* (2013.01); *H04N 1/00209* (2013.01); *H04L 2001/0096* (2013.01)
USPC ........................................................ 370/536

(58) Field of Classification Search
USPC ......................................................... 370/535
See application file for complete search history.

(56) References Cited

U.S. PATENT DOCUMENTS 5,239,545 A * 8/1993 Buchholz ...................... 370/348
6,574,795 B1 * 6/2003 Carr ................................ 725/71

(Continued)

FOREIGN PATENT DOCUMENTS

| JP | A-08-293874 | 11/1996 |
|---|---|---|
| JP | A-2001-333136 | 11/2001 |

(Continued)

OTHER PUBLICATIONS

Jun. 17, 2014 Office Action issued in Japanese Patent Application No. 2010-230477 (with translation.

*Primary Examiner* — Brian Roberts
*Assistant Examiner* — Abu-Sayeed Haque
(74) *Attorney, Agent, or Firm* — Oliff PLC

(57) ABSTRACT

A communication device includes: a division unit that divides first data to be transmitted to another communication device via a transmission path including a plurality of lanes into a plurality of second data; a transmission unit that transmits the plurality of second data to the another communication device by distributing them to either one of the plurality of lanes; and an error notification reception unit that receives an error notification when an error is detected from one of the plurality of second data received by the another communication device. When the error notification reception unit receives the error notification, the division unit divides second data, in which an error is detected, into a plurality of third data, and the transmission unit retransmits the second data to the another communication device by distributing the plurality of third data to either one of the plurality of lanes.

15 Claims, 12 Drawing Sheets

(51) Int. Cl.
   *H04L 1/18* (2006.01)
   *H04L 12/50* (2006.01)
   *H04N 1/32* (2006.01)
   *H04N 1/327* (2006.01)
   *H04N 1/00* (2006.01)

(56) References Cited

U.S. PATENT DOCUMENTS

| | | | | |
|---|---|---|---|---|
| 7,366,165 | B2* | 4/2008 | Kawarai et al. | 370/366 |
| 7,508,846 | B2* | 3/2009 | Peng | 370/536 |
| 8,233,539 | B2* | 7/2012 | Kwon | 375/240.13 |
| 8,458,280 | B2* | 6/2013 | Hausauer et al. | 709/212 |
| 2006/0171353 | A1* | 8/2006 | Nagata et al. | 370/329 |
| 2006/0290756 | A1* | 12/2006 | Hatasa et al. | 347/86 |
| 2009/0313519 | A1* | 12/2009 | Nagaraja | 714/751 |
| 2013/0121385 | A1* | 5/2013 | Tran | 375/219 |

FOREIGN PATENT DOCUMENTS

| | | |
|---|---|---|
| JP | A 2002-281002 | 9/2002 |
| JP | A 2006-178866 | 7/2006 |
| JP | A 2008-193707 | 8/2008 |

* cited by examiner

FIRST DATA (ORIGINAL DATA)

SECOND DATA (DATA FORMED BY DIVISION OF FIRST DATA)

STRUCTURE OF PACKET

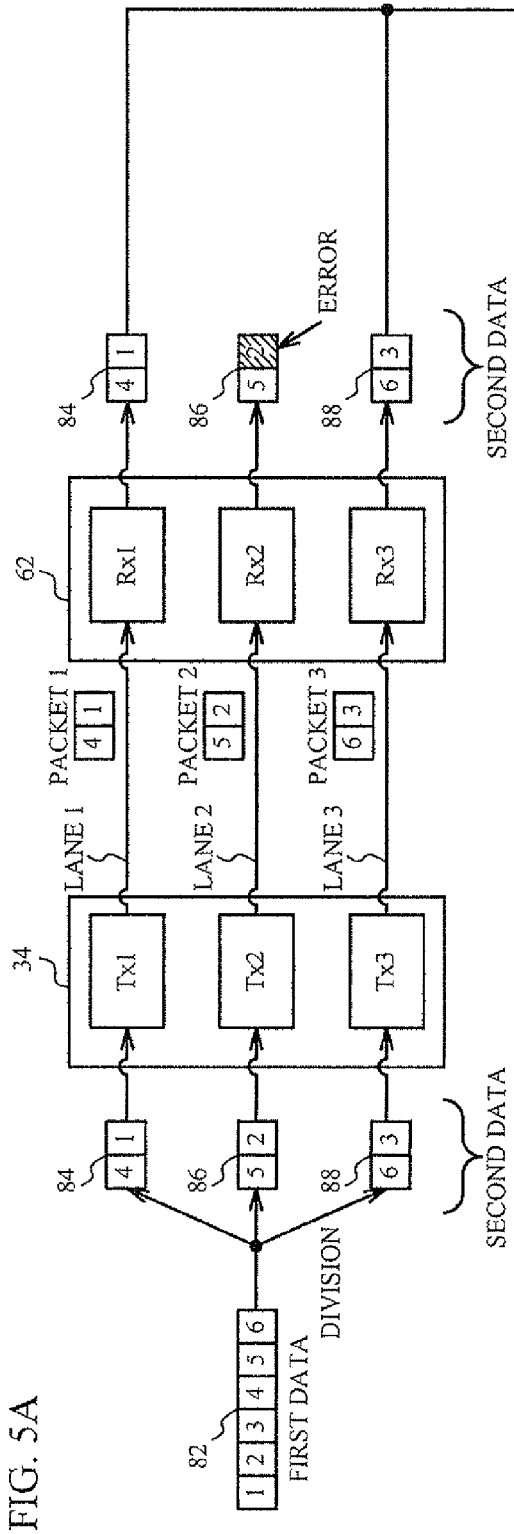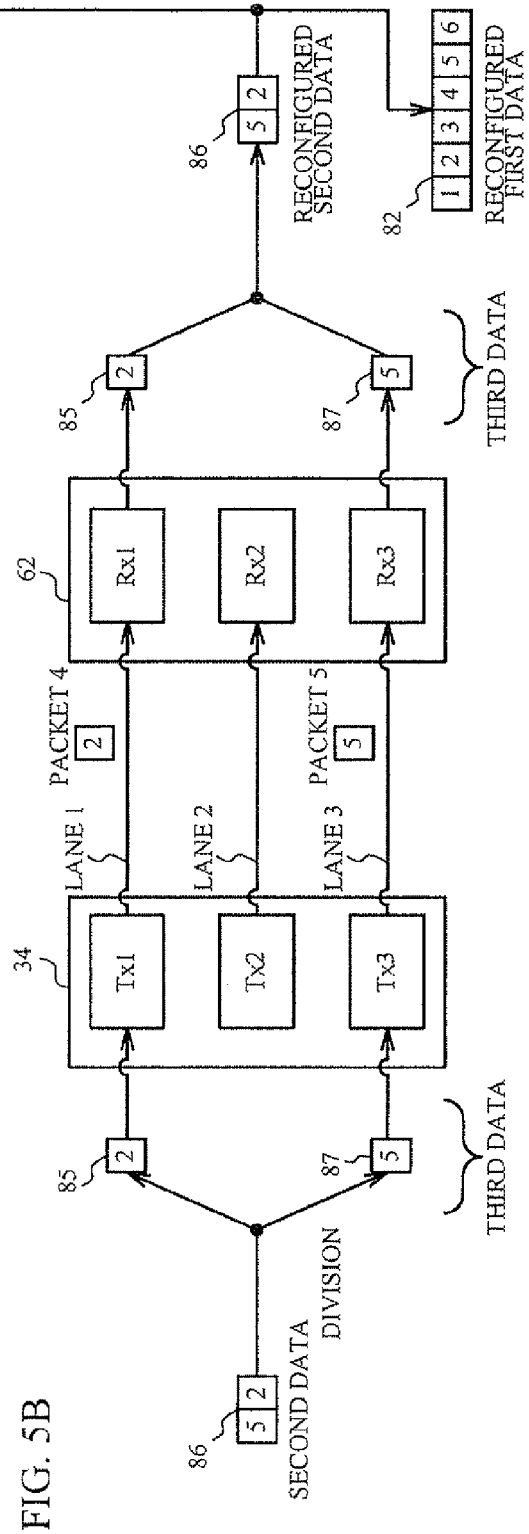
FIG. 5A
FIG. 5B

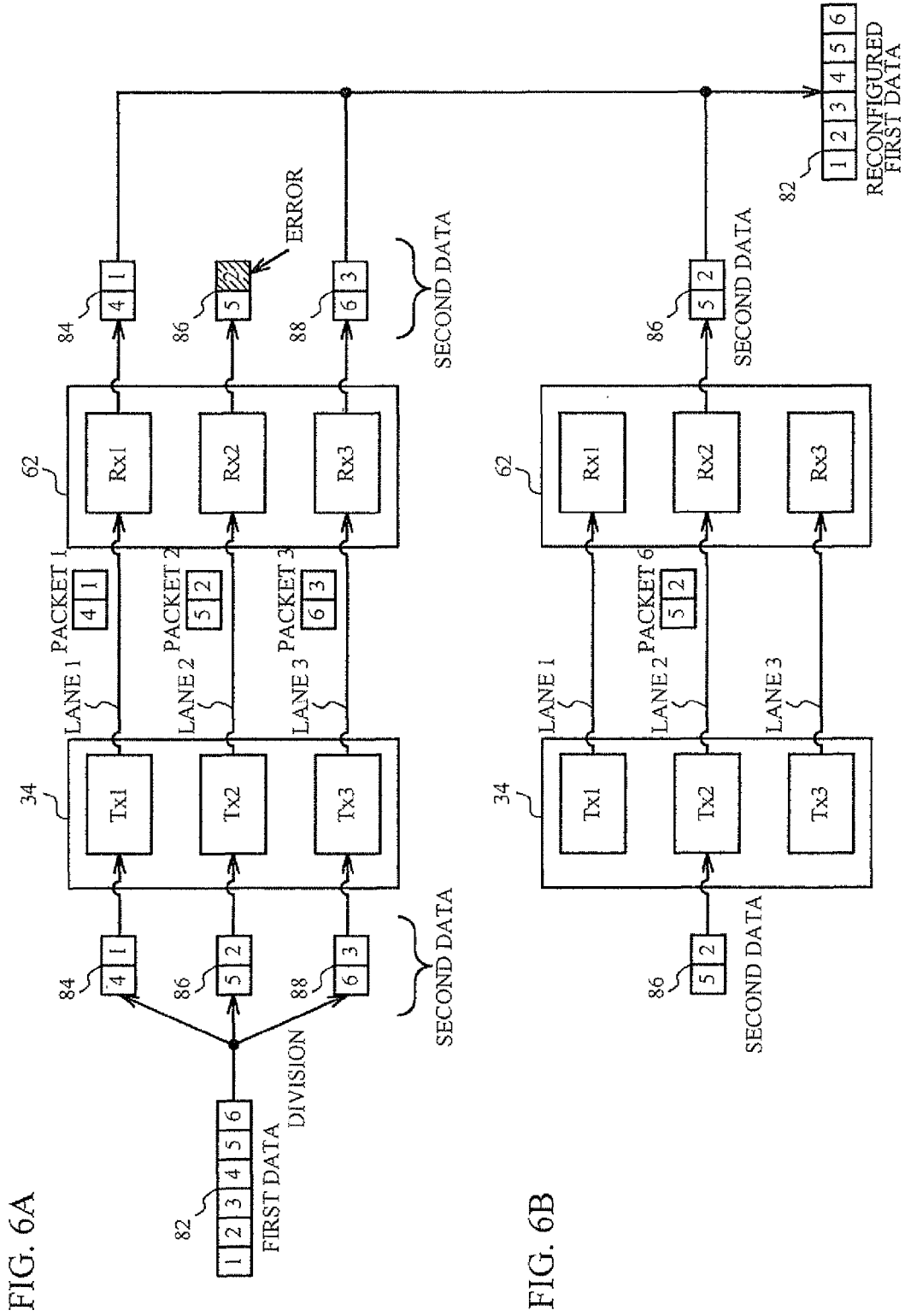

COMMUNICATION DEVICE, COMMUNICATION SYSTEM AND COMPUTER READABLE MEDIUM

CROSS-REFERENCE TO RELATED APPLICATION

This application is based on and claims priority under 35 USC 119 from Japanese Patent Application No. 2010-230477 filed on Oct. 13, 2010.

BACKGROUND (i) Technical Field

The present invention relates to a communication device, a communication system and a computer readable medium.

(ii) Related Art

There has been conventionally known a communication device that transmits a plurality of data in parallel via a transmission path including multiple lanes. For example, there is a communication device that divides image data into a plurality of color data, and transmits the plurality of color data to another communication device in parallel via a transmission path including multiple lanes.

SUMMARY

According to an aspect of the present invention, there is provided a communication device including: a division unit that divides first data to be transmitted to another communication device via a transmission path including a plurality of lanes into a plurality of second data; a transmission unit that distributes the plurality of second data divided by the division unit to either one of the plurality of lanes, and transmits the plurality of second data to the another communication device; and an error notification reception unit that receives an error notification when an error is detected from one of the plurality of second data received by the another communication device; wherein when the error notification reception unit receives the error notification, the division unit divides second data, in which an error is detected, into a plurality of third data, and the transmission unit retransmits the second data to the another communication device by distributing the plurality of third data divided by the division unit to either one of the plurality of lanes.

BRIEF DESCRIPTION OF THE DRAWINGS

Exemplary embodiments of the present invention will be described in detail based on the following figures, wherein:

FIG. 5A is an explanatory diagram illustrating a process from when the communication device in accordance with the first exemplary embodiment transmits the first data until when another communication device detects an error from the second data, and FIG. 5B is an explanatory diagram illustrating a process from when the communication device in accordance with the first exemplary embodiment retransmits the second data until when another communication device reconfigures the first data;

FIG. 6A is an explanatory diagram illustrating a process from when a communication device in accordance with a comparison example transmits the first data until when another communication device detects an error from the second data, and FIG. 6B is an explanatory diagram illustrating a process from when the communication device in accordance with the comparison example retransmits the second data until when another communication device reconfigures the first data;

DETAILED DESCRIPTION

A description will now be given, with reference to the accompanying drawings, of exemplary embodiments of the present invention.

First Exemplary Embodiment

Figure 1:
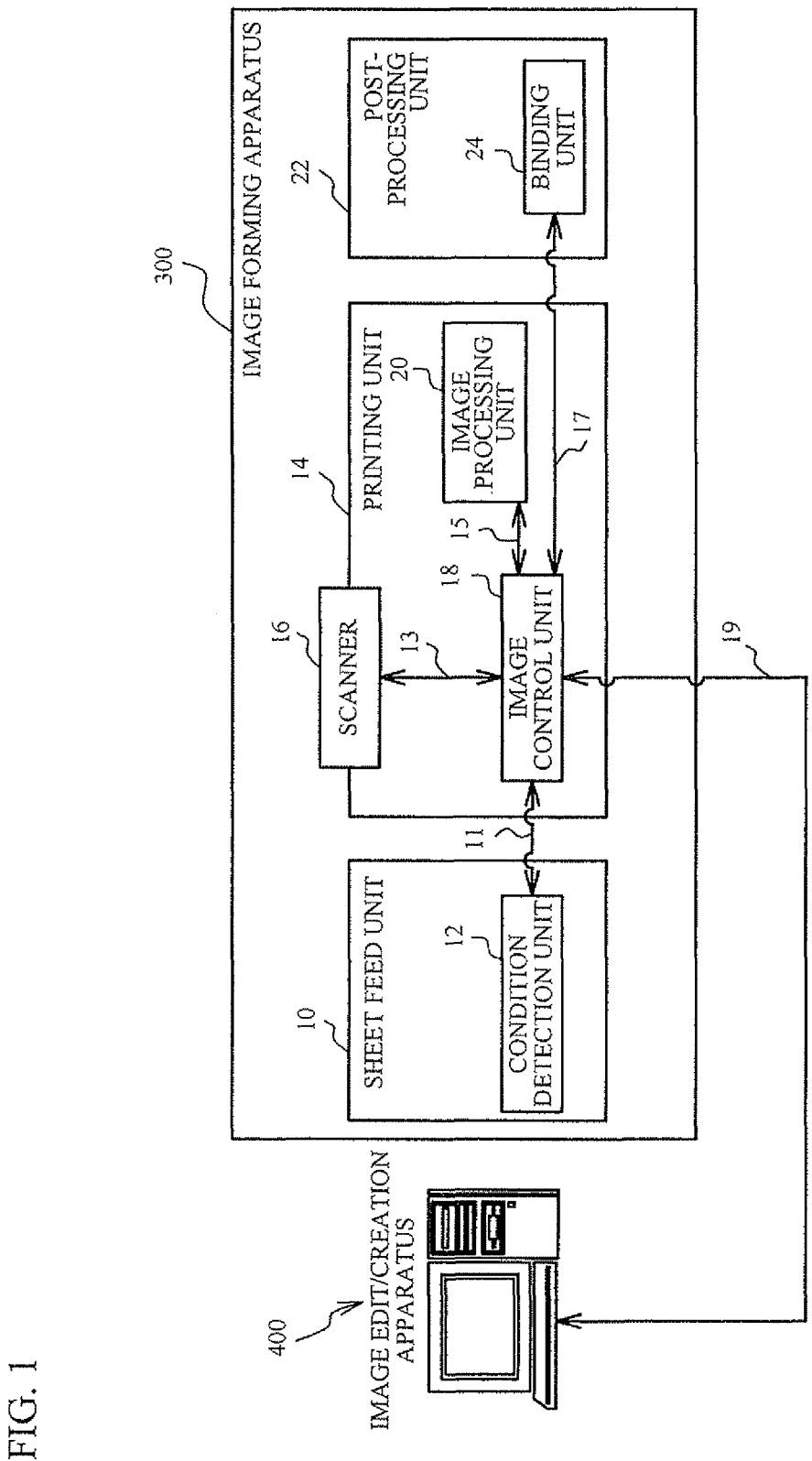
FIG. 1 is a block diagram illustrating an image forming apparatus which is an example of a communication device and a communication system in accordance with a first exemplary embodiment and a peripheral configuration thereof.

Referring to FIG. 1, a description will be given of an image forming apparatus which is an example of a communication device and a communication system in accordance with a first exemplary embodiment and a peripheral configuration thereof. FIG. 1 is a block diagram illustrating an image forming apparatus 300 in accordance with the first exemplary embodiment and a peripheral configuration thereof. As illustrated in FIG. 1, the image forming apparatus 300 is provided with a sheet feed unit 10, a printing unit 14 and a post-processing unit 22. The sheet feed unit 10 includes a condition detection unit 12. The printing unit 14 includes a scanner 16, an image control unit 18 and an image processing unit 20. The post-processing unit 22 includes a binding unit 24. The condition detection unit 12, the scanner 16, the image control unit 18, the image processing unit 20 and the binding unit 24 located in the image forming apparatus 300 communicate via transmission paths indicated by arrows 11, 13, 15 and 17. An image edit/creation apparatus 400 outside the image forming apparatus 300 communicates with the image forming apparatus 300 via a transmission path indicated by an arrow 19. Contents of communication include image data, commands representing instructions for processing and the like for example.

The sheet feed unit 10 feeds sheets to be printed. The condition detection unit 12 detects a color, size and the like of the sheet to be printed, and sends data about the detected color, size and the like of the sheet to the image control unit 18. The printing unit 14 prints image data on the sheet. The scanner 16 reads image data inputted for printing, and sends image data to the image control unit 18. The image control unit 18 sends image data to the image processing unit 20 and the image edit/creation apparatus 400 such as an external computer, for example. The image processing unit 20 receives image data from the image control unit 18, and executes a process of enlarging or reducing image data and a color correction process, for example. The post-processing unit 22 executes a post-process such as a distribution, fold, trim, and binding of printed sheets, for example. The binding unit 24 receives information about a position where printed sheets are bound and a direction of sheets, and executes a binding. The image edit/creation apparatus 400 edits image data received from the image control unit 18, or creates image data, and transmits image data to the image control unit 18. As described above, the image forming apparatus 300 and the image edit/creation apparatus 400 correspond to communication devices, and are part of a communication system. Each unit located in the image forming apparatus 300 corresponds to a communication device, and is a part of a communication system. For example, the condition detection unit 12 and the image control unit 18 correspond to communication devices, and are part of a communication system. The configuration illustrated in FIG. 1 is an example of a communication device and a communication system, and other configurations may be possible.

Figure 2:
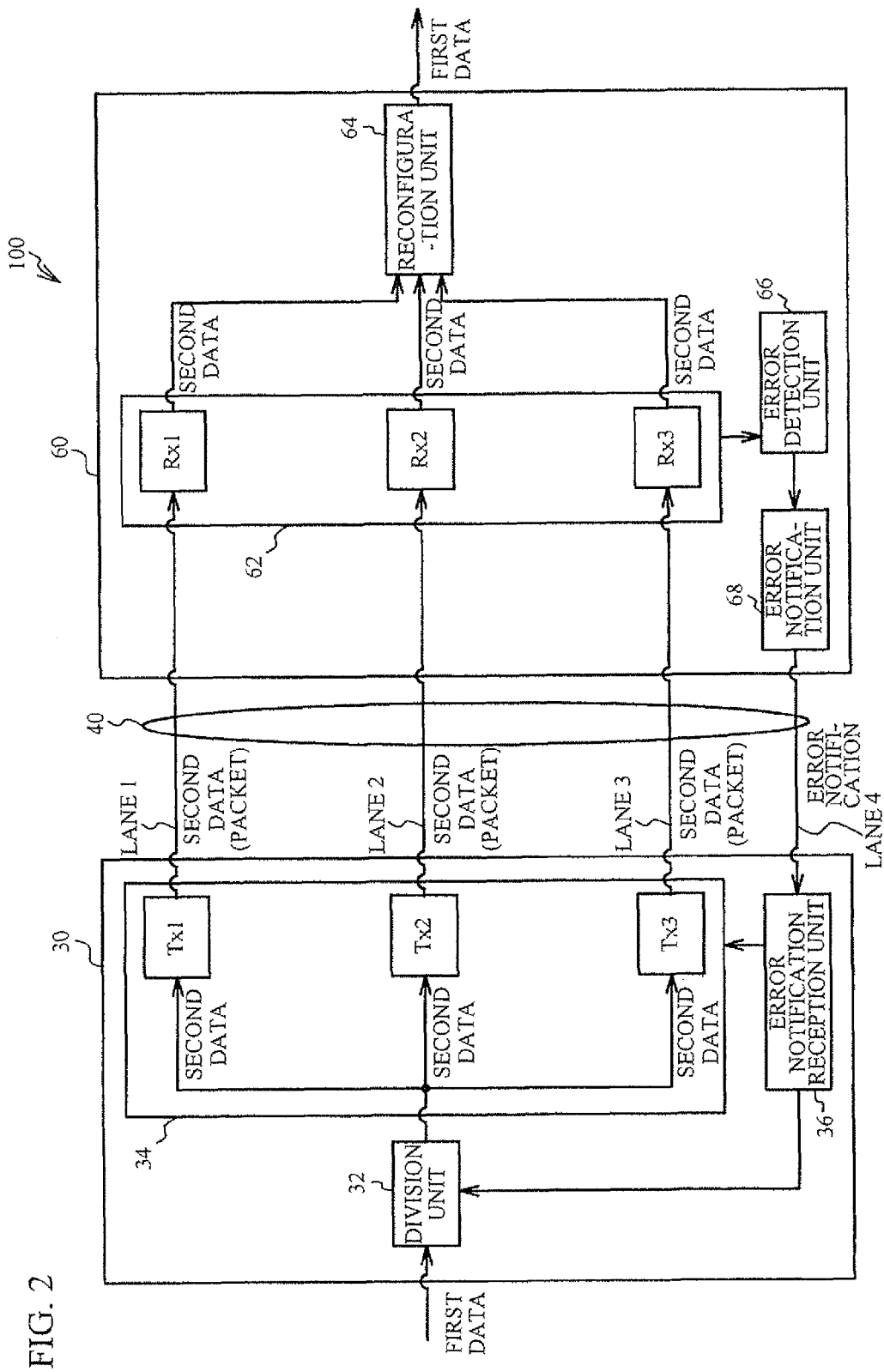
FIG. 2 is a block diagram illustrating an example of a configuration of the communication system in accordance with the first exemplary embodiment.

Referring to FIG. 2, a description will be given of an example of a configuration of a communication system in accordance with the first exemplary embodiment. FIG. 2 is a block diagram illustrating a configuration of a communication system in accordance with the first exemplary embodiment. As illustrated in FIG. 2, a communication system 100 is provided with a communication device 30 and a communication device 60. In the example in FIG. 1, for example, the communication device 30 is the image forming apparatus 300, and the communication device 60 is the image edit/creation apparatus 400. Alternatively, the communication device 30 is the scanner 16, and the communication device 60 is the image control unit 18. The communication device 30 and the communication device 60 transmit and receive data in parallel via a transmission path 40 including lanes 1, 2, 3 and 4. Each lane is an optical fiber or a coaxial cable. Lanes 1, 2 and 3 are used for data transmission from the communication device 30 to the communication device 60. The lane 4 is used for data transmission from the communication device 60 to the communication device 30. The number of lanes and the communication direction of each lane illustrated in FIG. 2 are one example, and the number of lanes and the communication direction of each lane may be changed.

The communication device 30 includes a division unit 32, a transmission unit 34, and an error notification reception unit 36. The division unit 32 divides first data, which is original data to be transmitted to the communication device 60 via the transmission path 40, into a plurality of second data. The first data may be data that the communication device 30 receives from another device as illustrated in FIG. 1, or data created by the communication device 30. The transmission unit 34 distributes the plurality of second data divided by the division unit 32 to the lane 1, 2 or 3, and transmits them to the communication device 60. The transmission unit 34 includes transmitters (hereinafter, abbreviated as Tx) 1, 2 and 3 which execute a transmission process of respective lanes. Tx1, Tx2 and Tx3 are a TOSA (Transmitter Optical Sub-Assembly), which converts the electrical signals into light, and the like when each lane is an optical fiber. Hereinafter, in a case where it is not necessary to distinguish Tx1, Tx2 and Tx3 from each other, Tx1, Tx2 and Tx3 are collectively referred to as the transmission unit 34. Tx1, Tx2 and Tx3 transmit the distributed plurality of second data via lanes 1, 2 and 3 respectively. The transmission unit 34 transmits the plurality of second data after converting them into the form of packets when it transmits the plurality of second data via lanes 1, 2 and 3. Packet is a data form for communication by dividing data into smaller sizes, and includes identification information and an error detection code as described later. A size of each packet may be a fixed size or a variable-length size. The error notification reception unit 36 receives an error notification in a case where an error is detected from one of the plurality of second data received by the communication device 60. FIG. 2 illustrates an example that the error notification reception unit 36 receives an error notification from the communication device 60 via the lane 4. It may be possible that the error notification reception unit 36 receives a notification of an error detected by a device such as monitoring device which monitors a communication condition of the transmission path 40 and is not directly associated with the communication of the communication devices 30 and 60. When the error notification reception unit 36 receives an error notification, the division unit 32 divides the second data, from which an error is detected, into a plurality of third data, and the transmission unit 34 retransmits the second data to the communication device 60 by distributing the plurality of third data divided by the division unit 32 to the lane 1, 2 or 3.

The communication device 60 includes a reception unit 62, a reconfiguration unit 64, an error detection unit 66, and an error notification unit 68. The reception unit 62 receives a plurality of second data or a plurality of third data from the communication device 30. The reception unit 62 includes receivers (hereinafter, abbreviated as Rx) 1, 2 and 3 which execute a reception process of respective lanes. When each lane is an optical fiber for example, Rx1, Rx2 and Rx3 are an ROSA (Receiver Optical Sub-Assembly) which converts light to electrical signal. Hereinafter, in a case where it is not necessary to distinguish Rx1, Rx2 and Rx3 from each other, Rx1, Rx2 and Rx3 are correctively referred to as the reception unit 62. Rx1, Rx2 and Rx3 receive second data or third data converted into a form of packets via lanes 1, 2 and 3 respectively. When the reception unit 62 receives a plurality of second data, the reconfiguration unit 64 reconfigures the first data according to identification information included in the plurality of second data. When the reception unit 62 receives a plurality of third data, the reconfiguration unit 64 reconfigures the retransmitted second data according to identification information included in the plurality of third data, and reconfigures the first data according to identification information included in the second data normally received and the reconfigured second data. The reconfiguration unit 64 outputs the reconfigured first data to the external device that executes a process using the reconfigured first data for example. The reconfiguration unit 64 may output the reconfigured first data to another unit provided to the communication device 60 for example. The error detection unit 66 detects an error such as a transmission error from the plurality of second data received from the communication device 30. The error notification unit 68 notifies the communication device 30 of an error notification via the lane 4 when the error detection unit 66 detects an error from one of the plurality of second data.

Figure 3A:
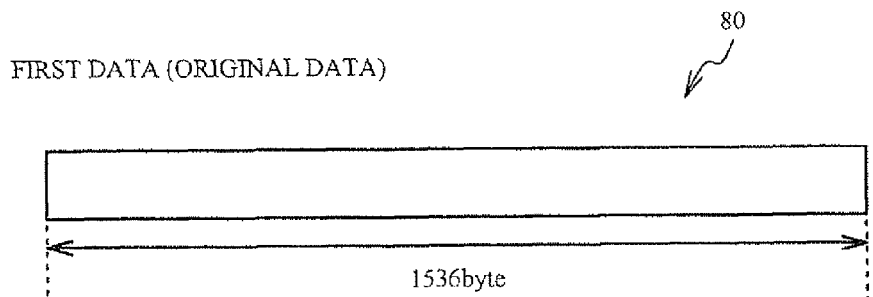
FIGS. 3A and 3B are diagrams illustrating first data in accordance with the first exemplary embodiment.
Figure 3B:
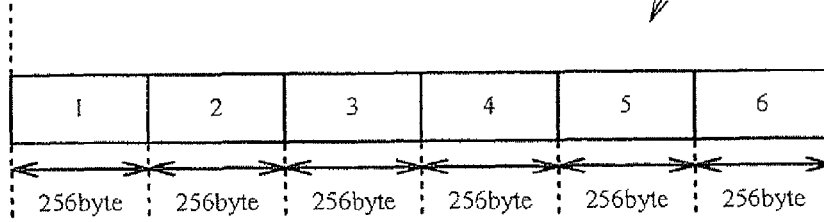
Figure 3C:
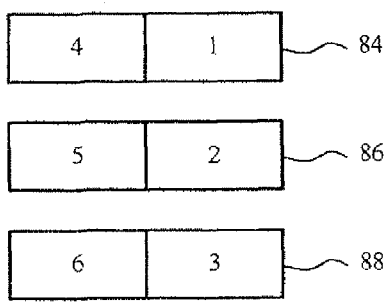
FIG. 3C is a diagram illustrating second data in accordance with the first exemplary embodiment.
Figure 3D:
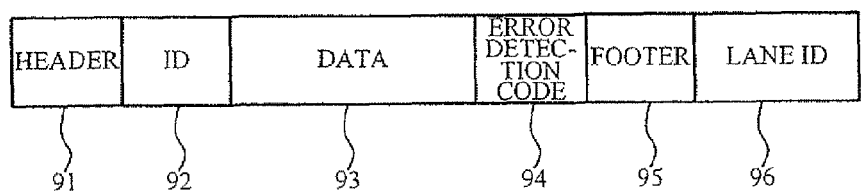
FIG. 3D is a diagram illustrating a structure of packet in accordance with the first exemplary embodiment.

Referring to FIGS. 3A through 3D, a description will be given of an example of a structure of data transmitted and received between the communication device 30 in accordance with the first exemplary embodiment and the communication device 60. FIGS. 3A and 3B are diagrams illustrating first data in accordance with the first exemplary embodiment. FIG. 3C is a diagram illustrating second data in accordance with the first exemplary embodiment. FIG. 3D is a diagram illustrating a structure of packet in accordance with the first exemplary embodiment.

As illustrated in FIG. 3A, first data 80 is image data or data of colors of the image with a size of 1536 bytes. First data 82 illustrated in FIG. 3B is an example dividing the first data 80 into six every 256 bytes. In the following description, data formed by dividing first data 82 every 256 bytes are described as data 1, 2, 3, 4, 5 and 6 from left. The division method of first data 82 illustrated in FIG. 3B is one example, and a division size and the number of division may take other values.

FIG. 3C illustrates a plurality of second data created by dividing the first data 82 by the division unit 32. The plurality of second data 84, 86 and 88 are data including a part of first data, and not including a part overlapping each other. The plurality of second data may be data including a part overlapping each other. In that case, the tolerance against a transmission error is improved because the data redundancy is increased. The first data 82 is reconfigured by rearranging each data forming the plurality of second data 84, 86 and 88. The second data 84 is formed by data 4 and 1. The second data 86 is formed by data 5 and 2. The second data 88 is formed by data 6 and 3. The method of dividing the first data 82 into a plurality of second data by the division unit 32 illustrated in FIG. 3C is one example, and other methods may be possible. For example, when the first data is image data, it may be divided according to the image processing rule and the like. Second data 84, 86 and 88 may be corresponded to color data such as Y (Yellow), M (Magenta), C (Cyan) and K (Black) for example.

FIG. 3D illustrates a data structure of packet formed by multiple fields, and each field stores a value. Names of field are "header 91", "identification information (ID) 92", "data 93", "error detection code 94", "footer 95" and "lane identification information (lane ID) 96" from the head. In the following description, a double quotation is put to the field name, and a single quotation is put to the value stored in each field.

As illustrated in FIG. 3D, information indicating the head and the end of the packet 90 are stored in "header 91" and "footer 95" respectively. Information indicating the type of data stored in "data 93" may be stored in "header 91" and "footer 95", and information indicating that the data stored in "data 93" is image data or a control command may be stored in "header 91" and "footer 95" for example. The identification information for identifying data stored in "data 93" is stored in "ID 92". For example, when 'second data 84' is stored in "data 93", '4 and 1' is stored in "ID 92". For example, '4 and 1' stored in "ID 92" is used when the reconfiguration unit 64 reconfigures the first data 82. The address of the storage unit such as memory where the communication device 60 stores the second data may be stored in "ID 92" for example. In that case, the reconfiguration unit 64 may reconfigure the first data according to the address of the storage unit stored in "ID 92". Second data or third data is stored in "data 93". Data for detecting an error of data 93 is stored in "error detection code 94". For example, data such as Cyclic Redundancy Check (CRC) is stored in "error detection code 94". The error in each packet is detected by using data stored in "error detection code 94". It may be possible that "error detection code 94" is replaced to "error correction code 94", and data for error correction code such as a humming code is stored. Information indicating identification information of the lane used for transmitting the packet is stored in "lane ID 96". For example, when the transmission unit 34 transmits the packet via the lane 1, '1' is stored in "lane ID 96". For example, when the transmission unit 34 converts the second data into the form of packet 90 and transmits it to the reception unit 62, the transmission unit 34 stores 'second data' in "data 93". The reception unit 62 retrieves 'second data' stored in "data 93" from received packet. Accordingly, the reception unit 62 receives the second data.

Figure 4:
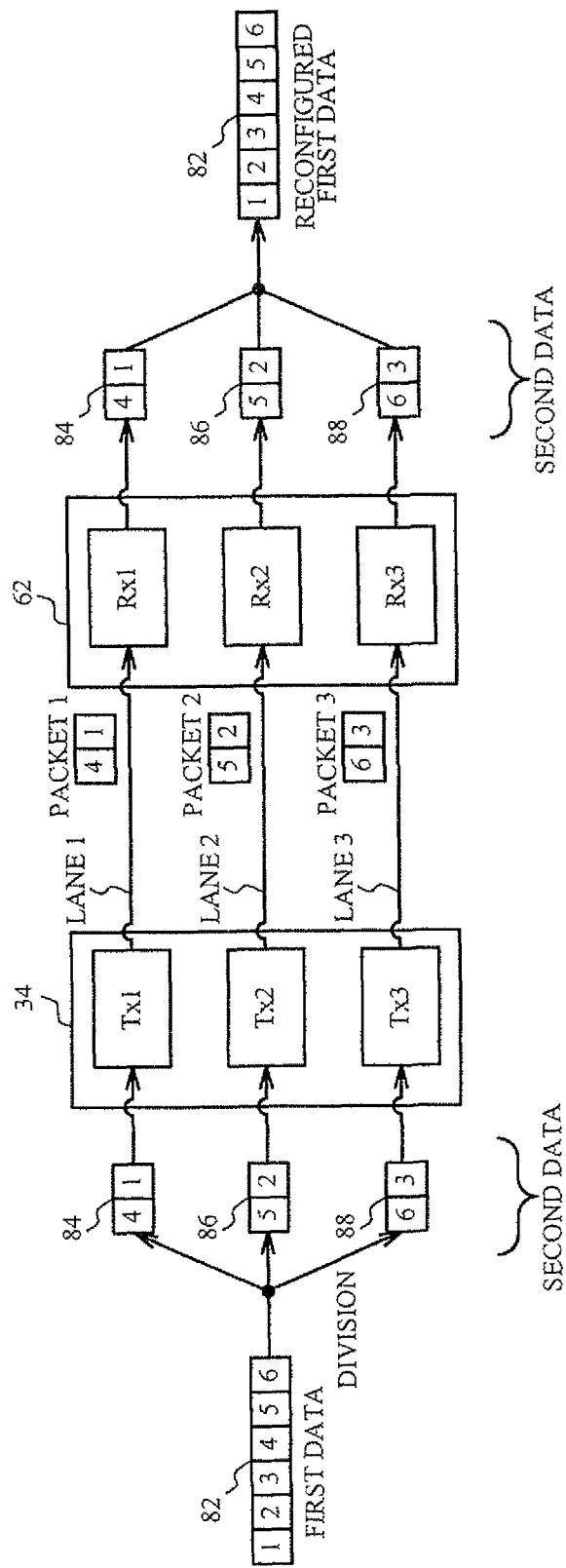
FIG. 4 is an explanatory diagram illustrating a process in a case where an error does not occur in a communication of the first data in the communication system in accordance with the first exemplary embodiment.
Figure 12:
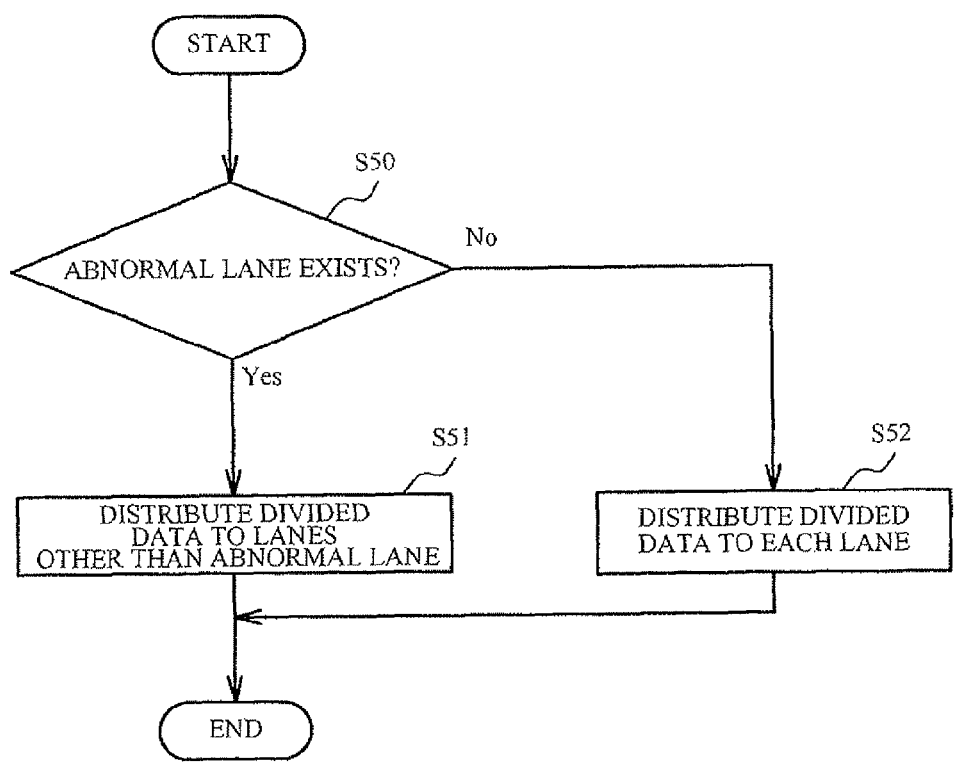
FIG. 12 is a flowchart illustrating a data distribution process in FIG. 11 in accordance with the second exemplary embodiment.

Referring to FIG. 4, a description will be given of an example of a process in a case where an error does not occur in the communication of the first data 82 in the communication system 100 in accordance with the first exemplary embodiment. In FIG. 4, a configuration of which a part of components in FIG. 12 is omitted and data flow are illustrated for the description.

As illustrated in FIG. 4, the division unit 32 divides the first data 82 into three second data 84, 86 and 88. The transmission unit 34 distributes three second data 84, 86 and 88 to lanes 1, 2 and 3 respectively. The transmission unit 34 converts second data 84, 86 and 88 into the form of packet 90. The data of second data 84, 86 and 88 converted into the form of the packets are referred to as packets 1, 2 and 3 respectively. The transmission unit 34 stores '4 and 1', 'second data 84', and in "ID 92", "data 93", and "lane ID 96" of the packet 1 respectively. The transmission unit 34 stores '5 and 2', 'second data 86' and '2' in "ID 92", "data 93" and "lane ID 96" of the packet 2 respectively. The transmission unit 34 stores '6 and 3', 'second data 88' and '3' in "ID 92", "data 93" and "lane ID 96" of the packet 3 respectively. Tx1, Tx2 and Tx3 transmit packets 1, 2 and 3 to the communication device 60 via lanes 1, 2 and 3 respectively.

Rx1, Rx2 and Rx3 receive packets 1, 2 and 3 via lanes 1, 2 and 3 respectively. The error detection unit 66 checks whether the error exits in the packet 1, 2 or 3 based on the value stored in "error detection code 94". Rx1, Rx2 and Rx3 verify the identification information stored in "ID 92" of packets 1, 2 and 3. Rx1, Rx2 and Rx3 retrieve 'second data 84', 'second data 86' and 'second data 88' stored in "data 93" from packets 1, 2 and 3 respectively. Rx1, Rx2 and Rx3 output second data 84, 86 and 88 and identification information to the reconfiguration unit 64 respectively. The reconfiguration unit 64 reconfigures the first data 82 based on second data 84, 86 and 88 and identification information. Then, the process is ended.

Referring to FIG. 5A and FIG. 5B, a description will be given of an example of a process in a case where an error occurs in the communication of the first data 82 in the communication system 100 in accordance with the first exemplary embodiment. FIG. 5A is an explanatory diagram illustrating a process from when the communication device 30 in accordance with the first exemplary embodiment transmits the first data 82 until when the communication device 60 detects an error from the second data 86. FIG. 5B is an explanatory diagram illustrating a process from when the communication device 30 in accordance with the first exemplary embodiment retransmits the second data 86 until when the communication device 60 reconfigures the first data 82. Assume that an error does not occur when the communication device 30 retransmits the second data 86.

As illustrated in FIG. 5A, as the process until when Rx1, Rx2 and Rx3 receive packets 1, 2 and 3 overlaps the description of FIG. 4, the description will be omitted. The error detection unit 66 detects an error from the packet 2 based on the value stored in "error detection code 94" of each packet. The error detection unit 66 executes an error correcting process when the error detected in the packet 2 is correctable. The subsequent processes are same as those described in FIG. 4.

When the error detected in the packet 2 is uncorrectable, the error detection unit 66 determines that an error occurs in the packet 2. '5 and 2' stored in "ID 92" and '2' stored in "lane ID 96" of the packet 2 are reported to the error detection unit 66 from Rx1, Rx2 and Rx3. The error detection unit 66 notifies the error notification unit 68 of '5 and 2' stored in "ID 92" and '2' stored in "lane ID 96" of the packet 2. The error notification unit 68 notifies the error notification reception unit 36 in the communication device 30 of '5 and 2' stored in "ID 92" and '2' stored in "lane ID 96" of the packet 2, in which the error is detected, via the lane 4. The error notification reception unit 36 notifies the division unit 32 and the transmission unit 34 of '5 and 2' stored in "ID 92" and '2' stored in "lane ID 96" which are notified.

As illustrated in FIG. 5B, the division unit 32 divides the second data 86 corresponding to '5 and 2' stored in "ID 92" of the notified packet 2 into a plurality of third data 85 and 87. The third data 85 and 87 includes data 2 and 5 respectively. The transmission unit 34 distributes third data 85 and 87 to lanes 1 and 3 other than the lane 2 where an error occurs respectively. The transmission unit 34 may distribute one of third data 85 and 87 to the lane 2. The transmission unit 34 converts third data 85 and 87 into a form of packet 90. The data of third data 85 and 87 converted into a form of packets are referred to as packets 4 and 5 respectively. The transmission unit 34 stores '2', 'third data 85', and '1' in "ID 92", "data 93", and "lane ID 96" of the packet 4 respectively. The transmission unit 34 stores '5', 'third data 87' and '3' in "ID 92", "data 93", and "lane ID 96" of the packet 5. Tx1, Tx2 and Tx3 transmit packets 4 and 5 to the communication device 60 via lanes 1 and 3 respectively.

Rx1 and Rx3 receive packets 4 and 5 via lanes 1 and 3 respectively. The error detection unit 66 checks that an error does not exist in the packet 4 or 5 based on values stored in "error detection code 94". Rx1 and Rx3 verify identification information stored in "ID 92" of packets 4 and 5 respectively. Rx1 and Rx3 retrieve 'third data 85' and 'third data 87' stored in "data 93" from packets 4 and 5 respectively. Rx1 and Rx3 output third data 85 and 86 and identification information to the reconfiguration unit 64 respectively. The reconfiguration unit 64 reconfigures the second data 86 based on third data 85 and 87. The reconfiguration unit 64 reconfigures the first data 82 based on second data 84 and 88 normally received, the retransmitted second data 86 and identification information. Then, the process is ended.

As describe above, the communication device 30 in accordance with the first exemplary embodiment retransmits the second data 86 by dividing the second data 86 in which an error is detected into third data 85 and 87, and distributing third data 85 and 87 to lanes 1 and 3. Each size of third data 85 and 87 is smaller than that of the second data 86. Therefore, a time for retransmission is shortened by dividing the second data 86 where an error is detected into third data 85 and 87, and distributing third data 85 and 87 to lanes 1 and 3, compared to the case where the second data 86, in which an error is detected, itself is retransmitted. Accordingly, the decrease of transmission efficiency by data retransmission is suppressed.

Referring to FIGS. 6A and 6B, for comparison with the first exemplary embodiment, a description will be given of an example of a process in a case where an error occurs in the communication of the first data 82 in the communication system in accordance with a comparison example. FIG. 6A is an explanatory diagram illustrating a process from when the communication device 30 in accordance with the comparison example transmits first data 82 until when the communication device 60 detects an error from the second data 86. FIG. 6B is an explanatory diagram illustrating a process from when the communication device 30 in accordance with the comparison example retransmits the second data 86 until when the communication device 60 reconfigures the first data 82. Assume that an error does not occur when the communication device 30 retransmits the second data 86.

As a description of FIG. 6A is a same as that of FIG. 5A, the description is omitted. As illustrated in FIG. 6B, in the communication device 30, the division unit 32 outputs second data 86 corresponding to '5 and 2' stored in "ID 92" of the notified packet 2 to the transmission unit 34 without dividing it. The transmission unit 34 converts the second data 86 into a form of packet 90. The data of the second data 86 converted into a form of packets is referred to as a packet 6. The transmission unit 34 stores '5 and 2', 'second data 86', and '2' in "ID 92", "data 93", and "lane ID 96" of the packet 6 respectively. Tx2 transmits the packet 6 to the communication device 60 via the lane 2.

In the communication device 60, Rx2 receives the packet 6 via the lane 2. The error detection unit 66 checks that an error does not exist in the packet 6 based on the value stored in "error detection code 94". Rx2 verifies identification information stored in "ID 92" of the packet 6. Rx2 retrieves 'second data 86' stored in "data 93" from the packet 6. Rx2 outputs the second data 86 and identification information to the reconfiguration unit 64. The reconfiguration unit 64 reconfigures the first data 82 based on the second data 84 and 86 normally received, the retransmitted second data 86 and identification information. Then, the process is ended.

As described above, in the comparison example, as the communication device 30 transmits the second data 86 in which an error is detected, a transmission speed becomes slow compared to a case where the second data 86 is divided into third data 85 and 87 and retransmitted as illustrated in FIG. 5B. Thus, the transmission efficiency decreases. Moreover, as a timing of when the reconfiguration of the first data 82 in the communication device 60 is completed delays, a subsequent process using the reconfigured first data 82 also delays.

Referring to a flowchart illustrated in FIG. 7, a description will be given of an example of a process with which the communication device 30 in accordance with the first exemplary embodiment transmits the first data to another communication device 60. The division unit 32 divides the first data into a plurality of second data (step S10). The transmission unit 34 distributes the plurality of second data to lanes 1, 2 or 3 (step S11). The transmission unit 34 converts the plurality of second data into a form of packet 90 (step S12). Tx1, Tx2 and Tx3 transmit packets to another communication device 60 via respective lanes (step S13).

The error notification reception unit 36 determines whether an error notification is received from another communication device 60 (step S14). The error notification includes identification information stored in "ID 92" and information for identifying the lane stored in "lane ID 96" of the packet in which the error is detected, for example. When the error notification reception unit 36 does not receive an error notification from another communication device 60 (step S14/NO), the process is ended. When the error notification reception unit 36 receives an error notification from another communication device 60 (step S14/YES), the division unit 32 divides the second data corresponding to identification information stored in "ID 92" of the packet in which an error is detected into a plurality of third data (step S15). The transmission unit 34 distributes the plurality of third data to the lane 1, 2 or 3 (step S16). In the step S16, the second data or the third data may be distributed to lanes other than the lane where an error occurs, or to the lane where an error occurs. The transmission unit 34 converts the third data into a form of packet 90 (step S17). The transmission unit 34 transmits packets to another communication device 60 via lanes (step S18). Then, the process is ended.

Figure 8:
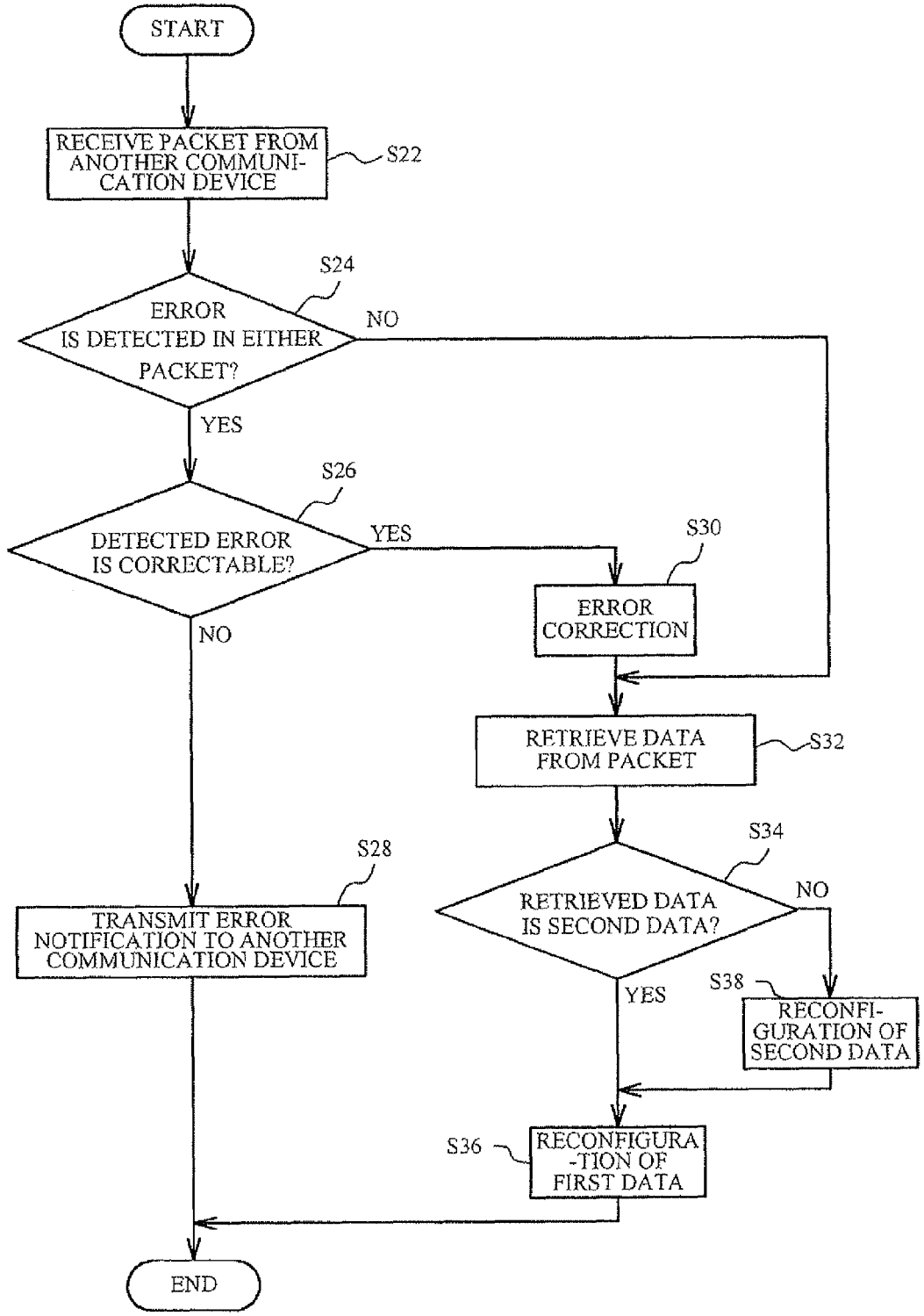
FIG. 8 is a flowchart illustrating a process that another communication device in accordance with the first exemplary embodiment receives the first data from the communication device.

Referring to a flowchart illustrated in FIG. 8, a description will be given of an example of a process that the communication device 60 receives the first data 82 from the communication device 30. The reception unit 62 receives packets from another communication device 30 via lanes (step S22). The error detection unit 66 determines whether an error is detected in one of received packets (step S24). In the step S24, the error detection unit 66 detects the error of packet by using the value stored in "error detection code 94" of the packet 90 for example. When an error is detected in one of received packets (step S24/YES), the error detection unit 66 determines whether the detected error is correctable (step S26). For example, when the detected number of bit error is less than the number of bit error which can be corrected by the error detection code 94, the error detection unit 66 determines that the detected error is correctable. When the detected error is correctable (step S26/YES), the error notification unit 68 transmits an error notification to another communication device 30 via the lane 4 (step S28), and the process is ended. When the detected error is uncorrectable (step S24/NO), the reception unit 62 retrieves 'second data' or 'third data' stored in "data 93" and identification information stored in "ID 92" of the packet (step S32), and outputs them to the reconfiguration unit 64. The reconfiguration unit 64 determines whether the data retrieved by the reception unit 62 is the second data (step S34). The determination in the step S34 may be carried out by comparing the given size of the second data and the third data with the size of data retrieved by the reception unit 62. Alternatively, it may be determined by providing a field for storing the information indicating whether it is the second data in the packet 90, and referring to the field. When the data retrieved by the reception unit 62 is the second data (step S34/YES), the reconfiguration unit 64 reconfigures the first data based on 'second data' stored in "data 93" and identification information stored in "ID 92" of the packet (step S36). When the data retrieved by the reception unit 62 is the third data (step S34/NO), the reconfiguration unit 64 reconfigures the second data based on 'third data' stored in "data 93" and identification information stored in "ID 92" of the packet (step S38). After the step S38, the first data is reconfigured in the step S36. Then, the process is ended.

Figure 7:
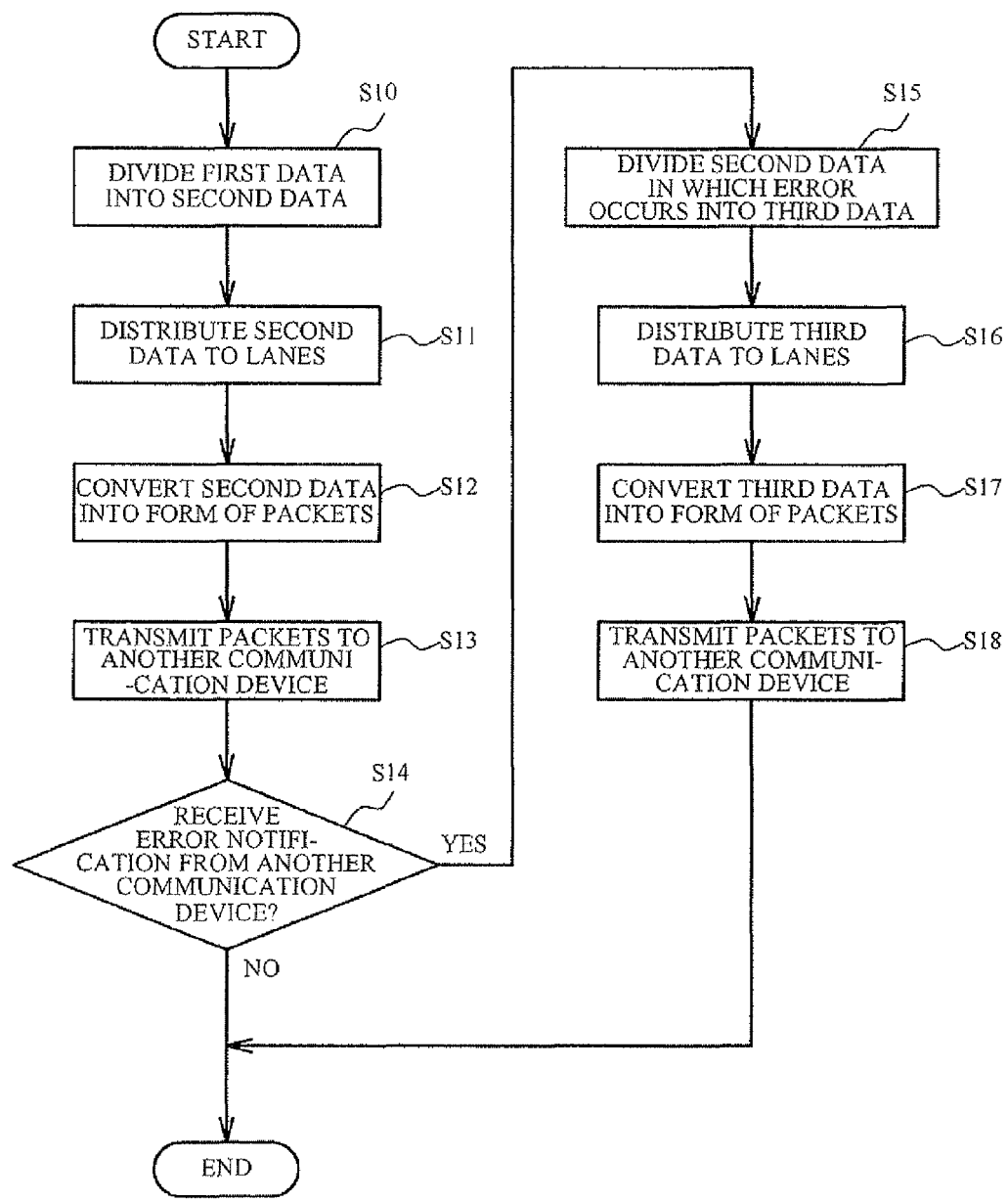
FIG. 7 is a flowchart illustrating a process that the communication device in accordance with the first exemplary embodiment transmits the first data to another communication device.

As described above, according to the first exemplary embodiment, when the error notification reception unit 36 receives an error notification that reports that an error occurs in the packet 2 transmitted via the lane 2 as described in the step S14 of FIG. 7, the division unit 32 divides the second data corresponding to the packet 2 in which an error is detected into third data 85 and 87 as described in the step S15 of FIG. 7, and the transmission unit 34 retransmits the second data 86 as described in the step S18 of FIG. 7 by distributing third data 85 and 87 to lanes 1 and 3 as described in the step S16 of FIG. 7. As described, when data where an error is detected is retransmitted, a time for data retransmission is reduced by dividing the data where the error is detected and retransmitting divided data via multiple lanes compared to the comparison example illustrated in FIG. 6A and FIG. 6B. Therefore, the decrease of the transmission efficiency caused by the data retransmission is suppressed.

As described in the first exemplary embodiment, when an error is detected in the second data 86, the reconfiguration unit 64 cannot reconfigure the first data 82 until the retransmission of the second data 86 is completed. Thus, if the timing of when the retransmission of the second data 86 is completed delays, the timing of when the reconfiguration of the first data 82 is completed delays. As illustrated in FIG. 5B, as the time for retransmission is shortened by dividing the second data 86 in which an error is detected into third data 85 and 87, and distributing and retransmitting third data 85 and 87 to lanes 1 and 3, the delay of timing of when the reconfiguration of the first data 82 by the reconfiguration unit 64 is completed is suppressed. Therefore, the delay of the process handling the reconfigured first data 82 is suppressed.

In the first exemplary embodiment, a description was given of a case where the transmission unit 34 distributes third data 85 and 86 to lanes 1 and 3 other than the lane 2 used for transmitting the second data 86 in which the error is detected when distributing the plurality of third data 85 and 87 to the lane 1, 2 or 3. When the transmission unit 34 distributes the plurality of second data to the lane 1, 2 or 3, it may distribute them to lanes other than the lane used for transmitting the second data in which the error is detected. When retransmitting data, if the lane where the error occurred is used again, there is a possibility that the error occurs again. In that case, the transmission efficiency decreases. As described in the first exemplary embodiment, the frequency of occurrence of the error in data retransmission is decreased by retransmitting data via the lanes other than the lane where the error occurred. Thus, the decrease of the transmission efficiency caused by the data retransmission is suppressed. When data is retransmitted, the lane where the error occurred may be used. Moreover, by using a timer, it is possible to prohibit the use of the lane where the error occurred for a given period of time. As there is a case that the disturbance such as incidental noise around the transmission path may calm down as the time passes, the decrease of the transmission efficiency caused by the data retransmission is suppressed by returning the lane where the error occurred to the normal lane after the given period passes.

A description was given of the configuration of the image forming apparatus 300 and the peripheral structure illustrated in FIG. 1 as an application example of the communication device and the communication system in accordance with the first exemplary embodiment. For example, assume that the communication device 30 is applied to the scanner 16, and the communication device 60 is applied to the image control unit 18 which is another transmission destination. In this case, the transmission unit in the scanner 16 transmits image data to the image control unit 18 which is another transmission destination via the transmission path. The image control unit 18 executes an image processing to image data received from the scanner 16. In the communication of image data, if an error occurs in specific data forming image data, the image control unit 18 cannot reconfigure image data until the retransmission of the specific data is completed. Thus, there is possibilities that the completion of the process handling the image data reconfigured by the image control unit 18 delays, and that an emergency stop of the system occurs. The time needed for retransmission of the data forming image data is shortened by applying the configuration of the communication device and the communication system in accordance with the first exemplary embodiment to the image forming apparatus. Therefore, the decrease of efficiency in the process handling image data of the image forming apparatus is suppressed in another transmission destination. It may be possible that the communication device 30 is applied to the image forming apparatus 300, and the communication device 60 is applied to the image edit/creation apparatus 400 which is another device for example. Configurations of the communication device and the communication system in accordance with the first exemplary embodiment may be applied for communicating data other than image data.

In the first exemplary embodiment, a descriptions was given using the example where each of lanes is one optical cable or one coaxial cable, and the transmission path is composed of optical fibers or coaxial cables. It is not necessary that each lane is physically independent like the optical cable or the coaxial cable. For example, the transmission path may be one optical fiber, and multiple signals may be transmitted by lights with different wavelengths. In that case, each of transmission paths of lights with different wavelengths corresponds to each lane.

In the first exemplary embodiment, a description was given of an example where each size of second data 84, 86 and 88 transmitted in parallel via lanes is 512 bytes. Moreover, a description was given of an example where each size of third data 85 and 87 transmitted in parallel via lanes is 256 bytes. As described above, variation in time needed for data transmission in each lane becomes difficult to occur by unifying the size of data transmitted by each lane. Therefore, the timing for starting the process of reconfiguring the first data in the reconfiguration unit 64 becomes difficult to delay. The division unit 32 may divide the first data or the second data so that sizes of the plurality of second data or the plurality of third data transmitted via lanes may be different from each other.

Figure 9:
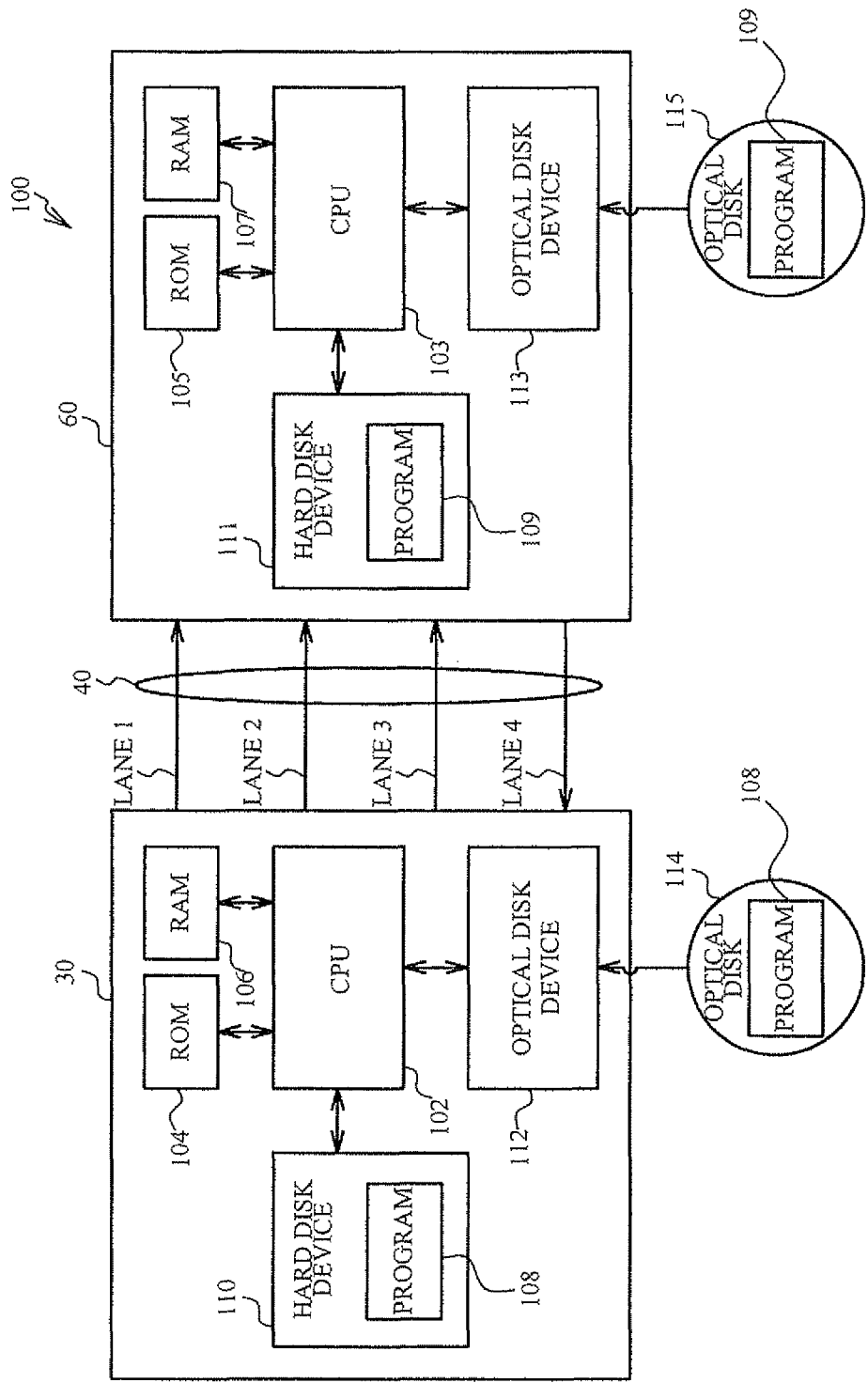
FIG. 9 is a block diagram illustrating a configuration that achieves the communication system in accordance with the first exemplary embodiment by a computer.

Communication devices 30 and 60 in the communication system 100 may be achieved by a computer including a CPU (Central Processing Unit), a ROM (Read Only Memory), a RAM (Random Access Memory) as illustrated in FIG. 9 for example. FIG. 9 is a block diagram illustrating a configuration to achieve the communication system 100 in accordance with the first exemplary embodiment by a computer. In FIG. 9, same reference numerals are put to same configurations as those illustrated in FIG. 2, and a description will be omitted. As illustrated in FIG. 9, the communication device 30 includes a CPU 102, a ROM 104, a RAM 106, a hard disk device 110 and an optical disk device 112. A program 108 for achieving functions of the division unit 32, the transmission unit 34 and the error notification reception unit 36 of the communication device 30 is stored in an optical disk 114. The optical disk 114 is a CD-ROM (Compact Disc Read Only Memory), a DVD (Digital Versatile Disc) and the like for example. The CPU 102 reads the program 108 from the optical disk 114 by the optical disk device 112, and installs the program 108 to the hard disk device 110. The CPU 102 achieves functions of the division unit 32, the transmission unit 34 and the error notification reception unit 36 by executing the program 108. The optical disk 114 is an example of a portable storage medium storing the program 108, and may be another portable storage medium such as a memory card. The optical disk device 112 is an example of a device reading out the program 108 from the portable storage medium storing the program 108, may be a device reading out the program 108 from other portable storage medium. In addition, a communication circuit connected to an external network is provided to the communication device 30, and the CPU 102 may download the program 108 from the external network. The communication device 60 includes a CPU 103, a ROM 105, a RAM 107, a hard disk device 111, and an optical disk device 113 in the same manner as the communication device 30. A program 109 for achieving functions of the reception unit 62, the reconfiguration unit 64, the error detection unit 66 and the error notification unit 68 of the communication device 60 is stored in an optical disk 115. The CPU 103 reads out the program 109 from the optical disk 115 by the optical disk device 112, and installs the program 109 to the hard disk device 111. The CPU 103 achieves functions of the reception unit 62, the reconfiguration unit 64, the error detection unit 66 and the error notification unit 68 by executing the program 109.

Second Exemplary Embodiment

Figure 10:
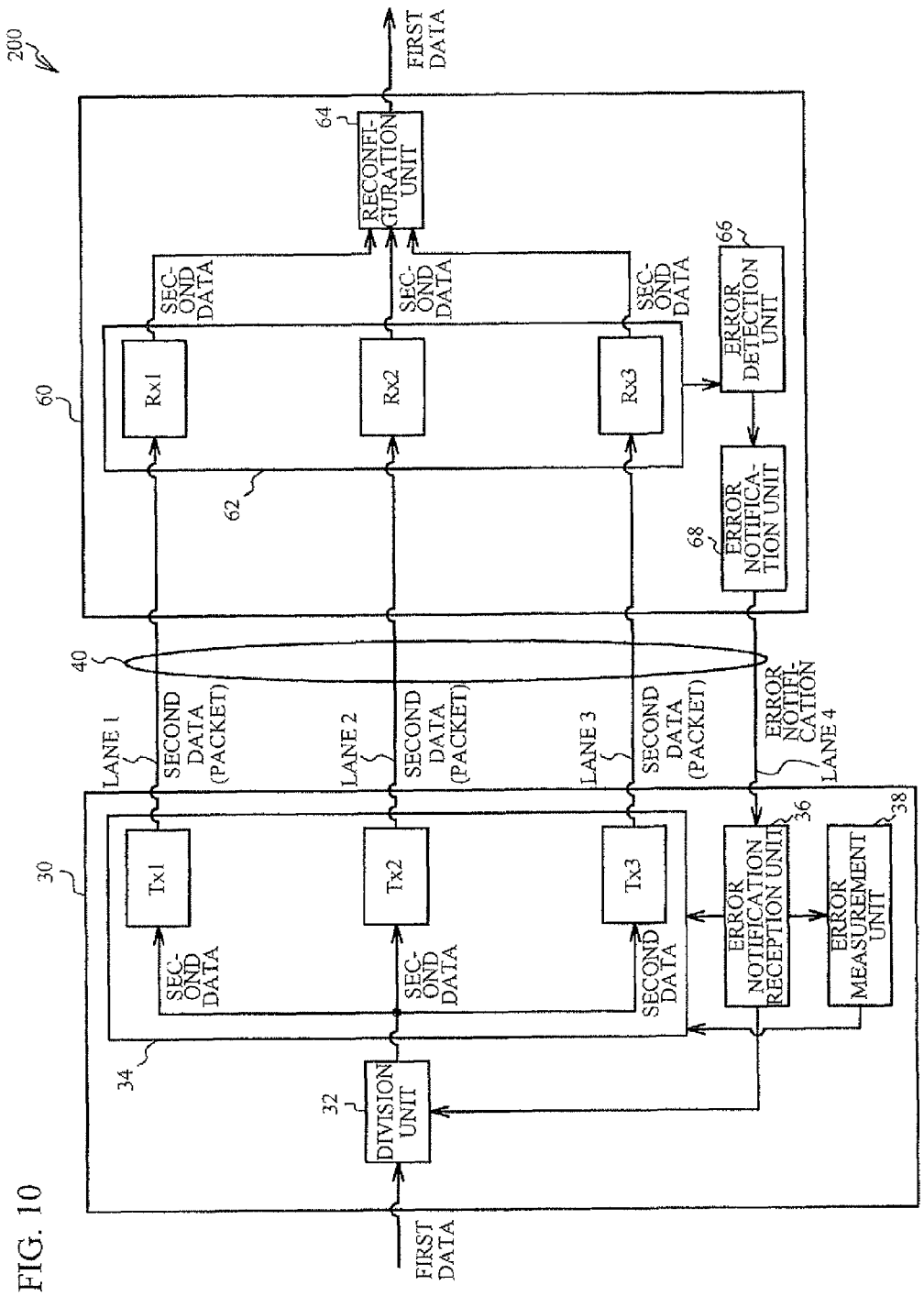
FIG. 10 is a block diagram illustrating a configuration of a communication system in accordance with a second exemplary embodiment.

Referring to FIG. 10, a description will be given of a configuration of a communication system in accordance with the second exemplary embodiment. FIG. 10 is a block diagram illustrating a configuration of the communication system in accordance with the second exemplary embodiment. A communication system 200 is different from the communication system 100 in that the communication device 30 includes an error measurement unit. In FIG. 10, same reference numerals are put to same configuration as those illustrated in FIG. 2.

As illustrated in FIG. 10, the communication device 30 includes an error measurement unit 38. The error measurement unit 38 measures the number of times that the error notification reception unit 36 receives the error notification with respect to each of lanes 1, 2 and 3. When the transmission unit 34 distributes a plurality of second data or a plurality of third data to the lane 1, 2 or 3, it distributes them to lanes other than the lane (abnormal lane) of which the number of times of the error notification reaches a given number. For example, when a given number is 1000, and the number of times of the error notification in the lane 2 reaches 1000, the transmission unit 34 distributes the plurality of second data or the plurality of third data to lanes 1 and 3 other than the lane 2.

Figure 11:
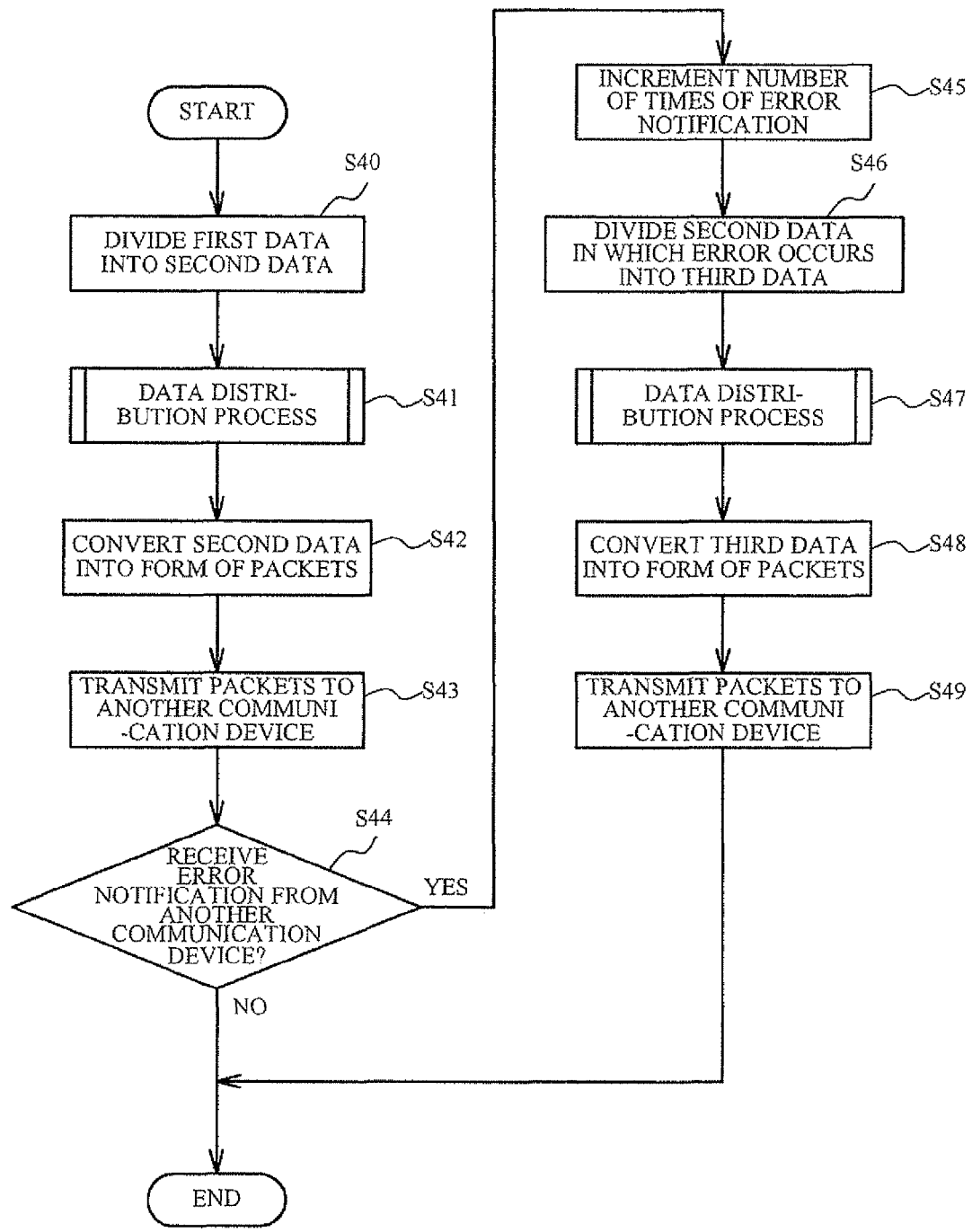
FIG. 11 is a flowchart illustrating a process that the communication device in accordance with the second exemplary embodiment distributes data to be transmitted to lanes other than an abnormal lane.

Referring to FIG. 11, a description will be given of an example of a process that the communication device 30 in accordance with the second exemplary embodiment distributes data to be transmitted to lanes other than the abnormal lane. FIG. 11 is a flowchart illustrating a process that the communication device 30 in accordance with the second exemplary embodiment distributes data to be transmitted to lanes other than the abnormal lane. The number of times of error notification is stored in a storage unit such as a ROM and a RAM, and it is initialized before the execution of the process in FIG. 11.

As procedures of steps S40, S42, S43, S44, S46, S48 and S49 illustrated in the flowchart in FIG. 11 are same as those of steps S10, S12, S13, S14, S15, S17 and S18 illustrated in the flowchart in FIG. 7 respectively, a description will be omitted. As illustrated in FIG. 11, after the step S40, the transmission unit 34 executes a data distribution process (step S41). When the determination of the step S44 is YES, the error measurement unit 38 measures increments in the number of times of error notification (step S45). After the step S46, the transmission unit 34 executes the data distribution process (step S547). After the execution of the step S49, the process is ended.

Referring to FIG. 12, a description will be given of a data distribution process in FIG. 11. FIG. 12 is a flowchart illustrating a data distribution process in FIG. 11. As illustrated in FIG. 12, the transmission unit 34 determines whether an abnormal lane exists based on the number of times of error notification measured by the error measurement unit 38 (step S50). When at least one of lanes 1, 2 and 3 is an abnormal lane (step S50/YES), the transmission unit 34 distributes a plurality of second data or a plurality of third data to lanes other than an abnormal lane (step S51). When an abnormal lane does not exist in lanes 1, 2 and 3 (step S50/No), the transmission unit 34 distributes the plurality of second data or the plurality of third data to lanes 1, 2 and 3 (step S52). Then, the process is ended.

As described above, according to the second exemplary embodiment, the communication device 30 includes the error measurement unit 38 that measures of the number of times that the error notification reception unit 36 receives the error notification with respect to each of lanes 1, 2 and 3, and the transmission unit 34 distributes the first data or the plurality of third data to lanes other than the abnormal lane where the number of times measured by the error measurement unit 38 reaches a given value when it distributes the first data or the plurality of third data to the lane 1, 2 or 3. It is assumed that the frequency of the occurrence of the error is high in the abnormal lane compared to lanes other than the abnormal lane. Thus, when the second data is retransmitted, the frequency of occurrence of error decreases by dividing the second data into the plurality of third data and distributing the plurality of third data to lanes other than the abnormal lane. Therefore, a decrease of transmission efficiency caused by data retransmission is suppressed. Instead of the number of times of the reception of error notification by the error notification reception unit 36 with respect to each of lanes 1, 2 and 3, the number of times of retransmission of packet by the transmission unit with respect to each of lanes 1, 2 and 3 may be used. Moreover, when the transmission unit 34 distributes the first data or the plurality of third data to the lane 1, 2 or 3, the transmission unit 34 may distribute the first data or the plurality of third data to lanes other than the lane where the frequency of the occurrence of error notification reaches a given value by calculating the frequency of the occurrence of error notification with respect to each of lanes 1, 2 and 3 based on the number of times of reception of error notification by the error notification reception unit 36 with respect to each of lanes 1, 2 and 3.

Communication devices 30 and 60 in the communication system 200 may be achieved by a computer including a CPU, a ROM, a RAM and the like for example in the same manner as FIG. 9. In that case, the CPU 102 achieves functions of the division unit 32, the transmission unit 34, the error notification reception unit 36, and the error measurement unit 38 by executing the program 108. The CPU 103 achieves functions of the reception unit 62, the reconfiguration unit 64, the error detection unit 66, and the error notification unit 68 by executing the program 109.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various exemplary embodiments and with the various modifications as are suited to the particular use contemplated. It is intended that the scope of the invention be defined by the following claims and their equivalents.

What is claimed is:

1. A image processing device comprising:
    a division device that divides first image data to be transmitted to an image control device via a transmission path including a plurality of lanes into a plurality of second image data;
    a transmission device that forms image data from the plurality of second image data and distributes the plurality of second image data divided by the division device to either one of the plurality of lanes, and transmits, in parallel, the image data packets of the plurality of second image data to the image control device, wherein the second image data does not overlap with each other; and
    an error notification reception device that receives an error notification when an error is detected from one of the plurality of second image data received by the image control device;
    wherein when the error notification reception device receives the error notification, the division device divides second image data, in which an error is detected, into a plurality of third image data, and the transmission device forms image data packets from the plurality of third image data retransmits the second image data to the image control device by distributing the image data packets of the plurality of third image data divided by the division device to either one of the plurality of lanes, and
    wherein the second image data excludes packets.

2. The image processing device according to claim 1, further comprising an error measurement device that measures a number of times that the error notification reception device receives the error notification with respect to each of the plurality of lanes,
    wherein when the transmission device distributes the plurality of second image data or the plurality of third image data to either one of the plurality of lanes, it distributes the plurality of second image data or the plurality of third image data to lanes other than a lane where the number of times measured by the error measurement device reaches a given value.

3. The image processing device according to claim 1, wherein the second image data corresponds to color data of yellow, magenta, cyan or black.

4. The image processing device according to claim 1, wherein the data structure of packet is formed by multiple fields, and each field stores a value.

5. The image processing device according to claim 4, wherein the multiple fields comprises a header, identification information, data, an error detection code, footer and lane identification information.

6. The image processing device according to claim 1, wherein the first image data comprises an image with a size of 1536 bytes.

7. The image processing device according to claim 6, wherein the first image data comprises six sets of data, wherein each of the sets of data comprises 256 bytes.

8. The image processing device according to claim 1, wherein the second image data comprises a plurality of second image data that each comprises a part of first image data, but each of the plurality of second image data does not comprise a part overlapping each other.

9. The image processing device according to claim 1, wherein the error notification reception device divides the second image data into the third image data in response to receiving an error by the image control device so that a time for retransmission is shortened by dividing the second image data where the error is detected into the third image data.

10. The image processing device according to claim 1, wherein the third image data is smaller than the second image data.

11. The image processing device according to claim 1, wherein when an error is detected in one of the packets of the first image data, the error detection device determines whether the detected error is correctable.

12. The image processing device according to claim 11, wherein when the detected error is correctable, the error notification device transmits an error notification to the image control device via a lane.

13. The image processing device according to claim 11, wherein when the detected error is uncorrectable, a reception device retrieves the second image data or the third image data and identification information, and outputs the second image data or the third image data and identification information to a reconfiguration device.

14. A image processing device, comprising:
a first image control device; and
a second image control device;
the first image control device, including:
  a division device that divides first image data to be transmitted to the second image control device via a transmission path including a plurality of lanes into a plurality of second image data;
  a transmission device that forms image data packets from the plurality of second image data and distributes, in parallel, the image data of the plurality of second image data divided by the division device to either one of the plurality of lanes, and transmits them to the second image control device; and
  an error notification reception device that receives an error notification when an error is detected from one of the plurality of second image data received by the second image control device, wherein the second image data excludes packets, and
wherein when the error notification reception device receives the error notification, the division device divides second image data, in which the error is detected, into a plurality of third image data, and the transmission device forms image data packets from the plurality of third image data and retransmits the second image data to the second image control device by distributing the image data packets of the plurality of third image data divided by the division device to either one of the plurality of lanes, and
wherein the second image control device including:
  a reception device that receives the plurality of second image data or the plurality of third image data from the first image control device;
  an error detection device that detects the error from the plurality of second image data received from the first image control device; and
  an error notification device that notifies the first communication device of the error when the error detection device detects the error from one of the plurality of second image data.

15. A non-transitory computer readable medium storing a program causing a computer to execute a process, the process comprising:
dividing first image data to be transmitted to an image control device via a transmission path including a plurality of lanes into a plurality of second image data via;
forming image data packets from the plurality of second image data;
distributing the image data packets of the plurality of second image data divided in the dividing to either one of the plurality of lanes, and transmitting in parallel them to the image control device; and
receiving an error notification when an error is detected from one of the plurality of second image data received by the image control device;
wherein when the error notification is received in the receiving, second image data in which the error is detected is divided into a plurality of third image data, and the second image data is retransmitted by distributing the plurality of third image data to either one of the plurality of lanes, and
wherein the second image data excludes packets.

* * * * *